UNITED STATES PATENT OFFICE.

IVAR WALFRID CEDERBERG, OF LIDINGÖ-BREVIK, SWEDEN, ASSIGNOR OF SEVEN-TENTHS TO HELGE MATTIAS BÄCKSTRÖM, OF DJURSHOLM, SWEDEN, AND GUSTAF ADOLF KYHLBERGER, OF STOCKHOLM, SWEDEN.

PROCESS OF PRODUCING AMMONIA.

1,396,557.

Specification of Letters Patent.  Patented Nov. 8, 1921.

No Drawing.  Application filed February 23, 1918. Serial No. 218,885.

*To all whom it may concern:*

Be it known that I, IVAR WALFRID CEDERBERG, a subject of the King of Sweden, residing at Lidingö-Brevik, in the Kingdom of Sweden, have invented new and useful Improvements in Processes of Producing Ammonia, of which the following is a specification.

It is known that a synthetic production of ammonia may be obtained by alternately passing nitrogen and hydrogen at increased temperature and under pressure, if required, over certain metals, for instance molybdenum, or over their hydrids or nitrids, or combinations thereof, ammonia being formed either during one of the periods or during both periods. The reaction taking place may be diagrammatically illustrated by means of the following formulas, in which Me denotes a metal:

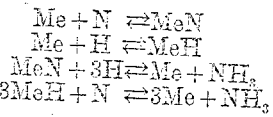

The yields of ammonia obtained in this manner, however, have been very unsatisfactory.

The present invention refers to an improvement on the process above referred to, according to which particularly good results are obtained. The improvement consists in using a pressure exceeding 250 atmospheres during the nitrogen period, and in alternately passing the nitrogen and hydrogen over a substance containing at least one metal forming an unstable nitrid, i. e. belonging to the second sub-groups of the main groups I—V of the periodic system—viz., copper, silver, gold, zinc, cadmium, mercury, gallium, indium, thallium, germanium, tin, lead, arsenic, antimony and bismuth. The metals may be used in metallic state, either separately or mixed with one another. Owing to a low melting point, or on account of volatility, however, some of the metals, for instance mercury, indium and arsenic, are not very suitable for use in their metallic state. Instead of the metals referred to compounds of the same may be used in which nitrogen or hydrogen or both these elements enter and which at increased temperature and under pressure, if required, react with nitrogen and hydrogen or with one of these elements.

It is essential to the present process to use with the said metals an exceedingly high pressure, which may be defined as over 250 atmospheres, during the nitrogen period in order that a metal-nitrogen compound may be formed. The velocity of reaction may be increased by finely dividing and in some cases also by mixing the said metals, or compounds with other substances, which may for instance be indifferent and serve as carriers, such as asbestos, chamotte, infusorial earth. During the hydrogen period, on the other hand, the ordinary atmospheric pressure may be used, and the reduction should be effected at the lowest possible temperature. Thus the pressure and the temperature are as a rule different during the two periods.

The favorable action obtained according to the present invention by the use of the metals or metal compounds above referred to, is due to the nitrids of said metals being unstable, which is a feature common to all metals here referred to by which they are characteristically distinguished from the metals heretofore used, and which makes it possible to perform the reduction at a lower temperature than heretofore used and thus to obtain a larger yield of ammonia.

I claim:

A process of synthetic production of ammonia consisting in alternately passing nitrogen and hydrogen over a substance containing at least one metal forming an unstable nitrid while using a pressure exceeding 250 atmospheres during the nitrogen period.

IVAR WALFRID CEDERBERG.